United States Patent
Matsumoto

(10) Patent No.: US 7,156,472 B2
(45) Date of Patent: Jan. 2, 2007

(54) BRAKE CONTROL APPARATUS

(75) Inventor: Hiroaki Matsumoto, Nagano-ken (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 10/756,392

(22) Filed: Jan. 14, 2004

(65) Prior Publication Data

US 2004/0140712 A1 Jul. 22, 2004

(30) Foreign Application Priority Data

Jan. 17, 2003 (JP) .......................... P.2003-009368

(51) Int. Cl.
*B60T 8/26* (2006.01)

(52) U.S. Cl. ..................... 303/186; 303/113.5
(58) Field of Classification Search ................ 303/186, 303/187, 188, 113.5
See application file for complete search history.

(56) References Cited

U.S. PATENT DOCUMENTS

| | | | |
|---|---|---|---|
| 5,632,535 A | | 5/1997 | Luckevich et al. |
| 5,938,299 A | * | 8/1999 | Hara et al. ................... 303/186 |
| 6,030,056 A | * | 2/2000 | Sawada et al. ........... 303/113.5 |
| 6,276,767 B1 | * | 8/2001 | Nishizawa ................... 303/186 |
| 6,354,676 B1 | | 3/2002 | Oshiro |

FOREIGN PATENT DOCUMENTS

| | | |
|---|---|---|
| DE | 101 31 323 A1 | 5/2002 |
| EP | 0 823 360 A2 | 2/1998 |
| JP | 7-144627 | 6/1995 |

OTHER PUBLICATIONS

European Search Report dated May 28, 2004.

Publication entitled Study on Vehicle ABS (3 sheets) which published on Jun. 30, 1993.

Publication entitled Performance of Vehicular Movement and Mechanism of Chassis (3 sheets) Which published on Sep. 10, 1994.

English language translation of publication entitled Study on Vehicle ABS (3 sheets) which published on Jun. 30, 1993. A copy of this publication is also enclosed with certain headings being translated into English.

English language translation of publication entitled Performance of Vehicular Movement and Mechanism of Chassis (3 sheets) which published on Sep. 10, 1994. A copy of this publication is also enclosed with certain headings being translated into English.

* cited by examiner

*Primary Examiner*—Thomas Williams
(74) *Attorney, Agent, or Firm*—Greenblum & Bernstein, P.L.C.

(57) ABSTRACT

A brake control apparatus having a brake pressure controlling unit including normally-open-type electromagnetic valves for preventing a fluid pressure transmitted from a master cylinder to wheel brakes when the valves close and a control unit executing an anti-lock brake control resolving a lock tendency of the wheels by controlling the operation of the brake pressure controlling unit according to a result of judgment of the lock tendency of wheels, and simultaneously executing a brake force distribution control distributing front and rear brake forces by controlling the normally-open-type electromagnetic valves in correspondence with rear wheels to close in such a manner that the normally-open-type electromagnetic valves are opened when the brake force distribution control is finished, wherein the control unit finishes the brake force distribution control after a vehicle stops and a load applied ahead of the vehicle is released.

5 Claims, 3 Drawing Sheets

BRAKE CONTROL APPARATUS

BACKGROUND OF THE INVENTION

1. Field of the Invention

The present invention relates to a brake control apparatus.

The present invention relates to a brake control apparatus comprising brake pressure controlling unit including normally-open-type electromagnetic valves for preventing a fluid pressure transmitted from a master cylinder to wheel brakes when the valves close, and a control unit executing an anti-lock brake control resolving a lock tendency of the wheels by controlling the operation of the brake pressure controlling unit according to a result of judgment of the lock tendency of wheels and simultaneously executing a brake force distribution control distributing front and rear brake forces by controlling the normally-open-type electromagnetic valves in correspondence with rear wheels to close in such a manner that the normally-open-type electromagnetic valves are opened when the brake force distribution control is finished. Wherein the control unit finishes the brake force distribution control after a vehicle stops and a load applied ahead of the vehicle is released.

2. Description of the Related Art

There has already been known a brake control apparatus for carrying out front and rear brake force distribution by controlling a normally-open-type electromagnetic valve provided between a master cylinder and a wheel brake of a rear wheel to a closing side (refer to, for example, Published Japanese Patent Application JP-A-7-144627).

Meanwhile, when the brake force distribution control is finished, the normally-open-type electromagnetic valve between the master cylinder and the wheel brake of the rear wheel is opened such that the brake fluid pressure of the rear wheel becomes a value in correspondence with output fluid pressure of the master cylinder, however, because of the opening of the normally-open-type electromagnetic valve, the brake pedal is brought in and a vehicle driver may feel strange feeling. Hence, according to the prior art, the brake force distribution control is finished when an estimated vehicle speed becomes equal to or smaller than a predetermined speed just before the vehicle stops to alleviate the strange feeling of the vehicle driver by bringing in the brake pedal when a swing back of the vehicle body is caused. However, the brake pedal is brought in before causing the swing back of the vehicle before the vehicle stops and it is difficult to regard that the strange feeling of the vehicle driver can firmly be resolved, wherein the swing back is caused when a load applied on the vehicle is released after the vehicle stops.

SUMMARY OF THE INVENTION

The present invention has been made in view of such a situation and it is an object thereof to provide a brake control apparatus firmly preventing the strange operational feeling when the brake force distribution control is finished.

In order to achieve the above-described object, according to a first aspect of the present invention, a brake control apparatus comprising a brake pressure controlling unit including normally-open-type electromagnetic valves for preventing a fluid pressure transmitted from a master cylinder to wheel brakes when the valves close, and a control unit executing an anti-lock brake control resolving a lock tendency of the wheels by controlling the operation of the brake pressure controlling unit according to a result of judgment of the lock tendency of wheels and simultaneously executing a brake force distribution control distributing front and rear brake forces by controlling the normally-open-type electromagnetic valves in correspondence with rear wheels to close in such a manner that the normally-open-type electromagnetic valves are opened when the brake force distribution control is finished. Wherein the control unit finishes the brake force distribution control after a vehicle stops and a load applied ahead of the vehicle is released.

According to a second and third aspects of the present invention as set forth in the first aspect of the present invention, the control unit may finish the brake force distribution control after a predetermined time elapsed from when a wheel speed of an estimated vehicle speed is reduced to be equal to or smaller than a predetermined speed just before the vehicle stops.

According to the constitution of the present invention as described above, the control unit finishes the brake force distribution control after a predetermined time elapsed from when a wheel speed of an estimated vehicle speed is reduced to be equal to or smaller than a predetermined speed just before the vehicle stops, it is difficult to recognize that the bringing in of a brake pedal by swing back of the vehicle when the vehicle stops and the strange operational feeling can firmly be prevented from being deteriorated when the brake force distribution control finishes.

In order to achieve the above-described object, according to a fourth and fifth aspects of the present invention as set forth in the first aspect of the present invention, the control unit finishes the brake force distribution control after an estimated deceleration is reduced to be equal to or smaller than a predetermined deceleration from when a wheel speed of an estimated vehicle speed is reduced to be equal to or smaller than a predetermined speed just before the vehicle stops, it is difficult to recognize that the bringing in of a brake pedal by swing back of the vehicle when the vehicle stops and the strange operational feeling can firmly be prevented from being deteriorated when the brake force distribution control finishes.

According to a sixth and seventh aspects of the present invention as set forth in the second and third aspects of the present invention, the predetermined time may be 300 msec.

According to an eighth and ninth aspects of the present invention as set forth in the second and fourth aspects of the present invention, the predetermined wheel speed may be 2 km/h.

According to a tenth aspect of the present invention as set forth in the first aspect of the present invention, the brake pressure control unit further including a normally-open-type electromagnetic valve in correspondence with a wheel brake, a check valve connected in parallel with the normally-open-type electromagnetic valve, a normally-close-type electromagnetic valve in correspondence with the wheel brake and a reservoir in correspondence with an output fluid path.

DETAILED DESCRIPTION OF THE PREFERRED EMBODIMENT

An explanation will be given of a mode for carrying out the invention based on embodiments of the present invention shown in the attached drawings as follows.

Figure 1:
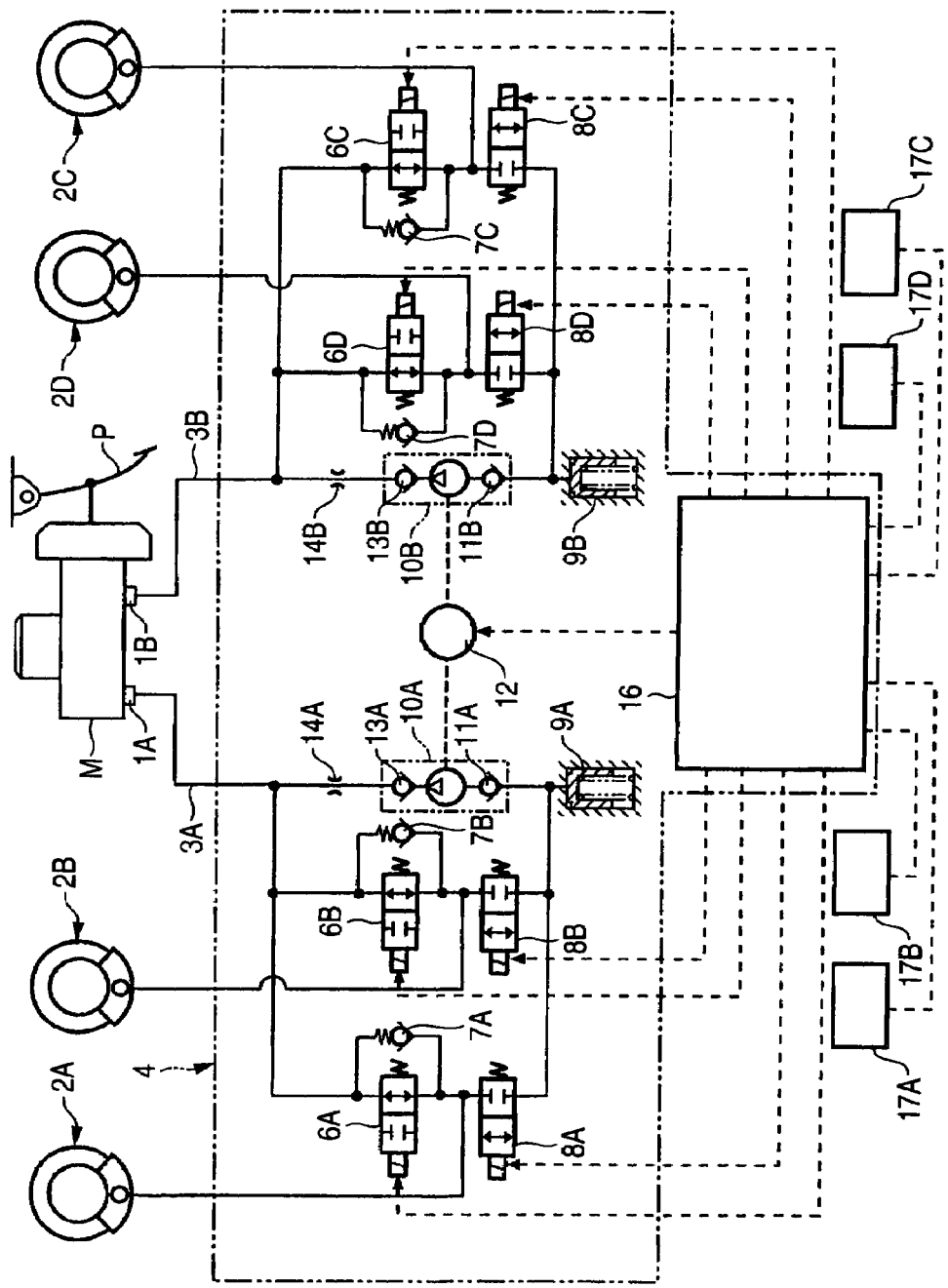
FIG. 1 is a fluid circuit diagram of a brake apparatus according to a first embodiment corresponding to the second and the third aspect of the present invention.
Figure 2:
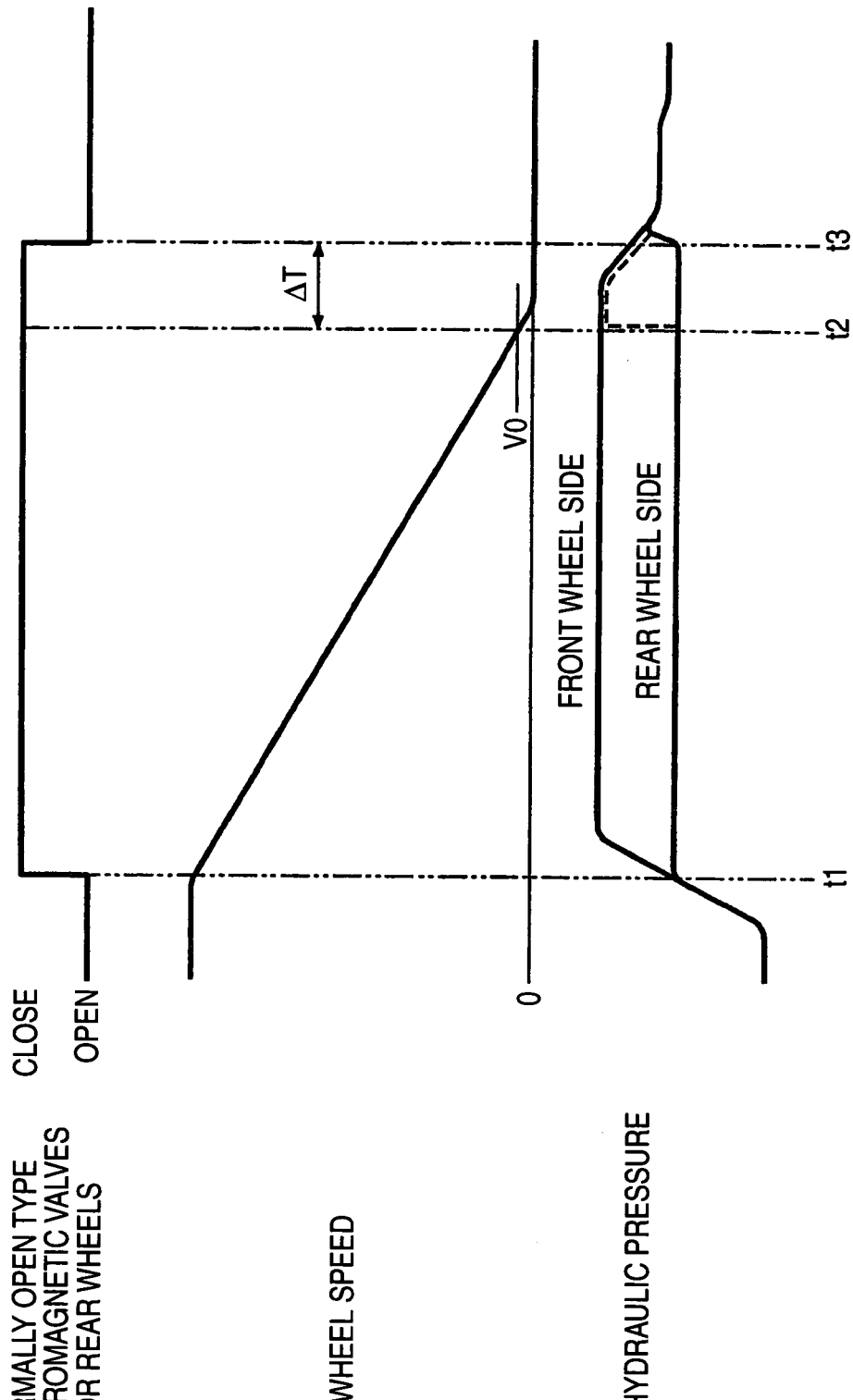
FIG. 2 is a timing chart.

FIG. 1 and FIG. 2 show a first embodiment corresponding to the second and third aspect of the present invention, FIG. 1 is a fluid circuit diagram of a brake apparatus and FIG. 2 is a timing chart.

First, in FIG. 1, a master cylinder M of a tandem type includes a first and a second output port 1A and 1B for producing brake fluid pressure according to depressing force applied to a brake pedal P by a vehicle driver. Brake pressure controlling unit 4 is provided between a left front wheel brake 2A, a right rear wheel brake 2B, a right front wheel brake 2C and a left rear wheel brake 2D and a first and a second output fluid paths 3A and 3B individually connected to the first and second output ports 1A and 1B.

The brake pressure controlling unit 4 includes a first, a second, a third and a fourth normally-open-type electromagnetic valve 6A through 6D individually in correspondence with the left front wheel brake 2A, the right rear wheel brake 2B, the right front wheel brake 2C and the left rear wheel brake 2D; a first, a second, a third and a fourth check valve 7A through 7D connected respectively in parallel with the normally-open-type electromagnetic valves 6A through 6D; a first, a second, a third and a fourth normally-close-type electromagnetic valve 8A through 8D individually in correspondence with the respective wheel brakes 2A through 2D; a first and a second reservoir 9A and 9B respectively in correspondence individually with the first and the second output fluid paths 3A and 3B; a first and a second pump 10A and 10B of a plunger type having suction valves 11A and 11B connected to the first and the second reservoirs 9A and 9B and having discharge valves 13A and 13B; a single piece of common electric motor 12 for driving the two pumps 10A and 10B; orifices 14A and 14B interposed between the two pumps 10A and 10B and the two output fluid paths 3A and 3B; and a control unit 16 for controlling operation of the respective normally-open-type electromagnetic valves 6A through 6D, the respective normally-close-type electromagnetic valves 8A through 8D and the electric motor 12.

The first normally-open-type electromagnetic valve 6A is provided between the first output fluid path 3A and the left front brake 2A, the second normally-open-type electromagnetic valve 6B is provided between the first output fluid path 3A and the right rear wheel brake 2B, the third normally-open-type electromagnetic valve 6C is provided between the second output fluid path 3B and the right front wheel brake 2C and the fourth normally-open-type electromagnetic valve 6D is provided between the second output fluid path 3B and the left rear wheel brake 2D.

Further, the first through the fourth check valves 7A through 7D are connected in parallel with the respective normally-open-type electromagnetic valves 6A through 6D such that a flow of a brake fluid from the corresponding wheel brakes 2A through 2D to the master cylinder M is permitted.

The first normally-close-type electromagnetic valve 8A is provided between the left front wheel brake 2A and the first reservoir 9A, the second normally-close-type electromagnetic valve 8B is provided between the right rear wheel brake 2B and the first reservoir 9A, the third normally-close-type electromagnetic valve 8C is provided between the right front wheel brake 2C and the second reservoir 9B and the fourth normally-close-type electromagnetic valve 8D is provided between the left rear wheel brake 2D and the second reservoir 9B.

In normally braking operation when there is not a possibility of locking the respective wheels, the brake pressure controlling unit 4 communicates the master cylinder M and the wheel brakes 2A through 2D and blocks the wheel brakes 2A through 2D from the reservoirs 9A and 9B. That is, the respective normally-open-type electromagnetic valves 6A through 6D are demagnetized and in an opened state, and the respective normally-close-type electromagnetic valves 8A through 8D are a demagnetized and in a closed state. The brake fluid pressure outputted from the first output port 1A of the master cylinder M operates to the left front wheel brake 2A via the first normally-open-type electromagnetic valve 6A and operates to the right rear wheel brake 2B via the second normally-open-type electromagnetic valve 6B. Further, the brake fluid pressure outputted from the second output port 1B of the master cylinder M operates to the right front wheel brake 2C via the third normally-open-type electromagnetic valve 6C and operates to the left rear wheel brake 2D via the fourth normally-open-type electromagnetic valve 6D.

When the wheel is going to be brought into a locked state in the braking operation, the brake pressure controlling unit 4 closes between the master cylinder M and the wheel brakes 2A through 2D, and simultaneously communicates through the wheel brakes 2A through 2D and the reservoirs 9A and 9B at a portion thereof in correspondence with the wheel which is going to be brought into the locked state. That is, the normally-open-type electromagnetic valve in the first through the fourth normally-open-type electromagnetic valves 6A through 6D in correspondence with the wheel which is going to be brought into the locked state is excited and in the closed state, and the normally-close-type electromagnetic valve of the first through the fourth normally-close-type electromagnetic valve 8A through 8D in correspondence with the wheel is excited and in the opened state. Thereby, a part of the brake fluid pressure of the wheel which is going to be brought into the locked state is absorbed by the first reservoir 9A or the second reservoir 9B and the brake fluid pressure of the wheel which is going to be brought into the locked state is reduced.

Further, when the brake fluid pressure maintains constant pressure, the brake pressure controlling unit 4 makes in a state that the wheel brakes 2A through 2D are blocked from the master cylinder M and the reservoirs 9A and 9B. That is, the normally-open-type electromagnetic valves 6A through 6D are excited and in the closed state and the normally-close-type electromagnetic valves 8A through 8D are demagnetized and in the closed state. Further, when the brake fluid pressure is increased, the normally-open-type electromagnetic valves 6A through 6D may be demagnetized and in the opened state, and the normally-close-type electromagnetic valves 8A through 8D may be demagnetized and in the closed state.

By controlling to demagnetize and excite the respective normally-open-type electromagnetic valves 6A through 6D and the respective normally-close-type electromagnetic valves BA through 8D by the control unit 16 in this way, the wheel can be controlled efficiently without been locked.

Further, in braking operation, there can also be carried out a brake force distribution control for distributing front and rear brake forces by closing the second and the fourth normally-open-type electromagnetic valves 6B and 6D of the first through the fourth normally-open-type electromagnetic valves 6A through 6D of the brake pressure controlling unit 4 in correspondence with the left and the right rear wheels. The control unit 16 executes the brake force distribution control by opening the second and the fourth normally-open-type electromagnetic valves 6B and 6D when the brake force distribution control for distributing the front and the rear brake forces is finished by controlling the second and the fourth normally-open-type electromagnetic valves 6B and 6D to the valve closing side.

Further, the control unit 16 is inputted detected values of wheel speed sensors 17A and 17B for respectively detecting wheel speeds of the left front wheel and the right rear wheel and wheel speed sensors 17C and 17D for respectively detecting wheel speeds of the right front wheel and the left rear wheel and the control unit 16 finishes the brake force distribution control when a predetermined time elapsed after, for example, the wheel speeds of the right and the left rear wheels detected by the wheel speed sensors 17B and 17D are reduced to be equal to or smaller than a predetermined speed just before the vehicle stops.

That is, in FIG. 2, in the brake force distribution control at the time of braking of the vehicle, in accordance with starting the brake force distribution control at time t1 in a braked state, the second and the fourth normally-open-type electromagnetic valves 6B and 6D in correspondence with the rear wheels are closed and in accordance therewith, the brake fluid pressure on the rear wheel side is restrained to be lower than the brake fluid pressure on the front wheel side. Further, after the rear wheel speed is reduced to be equal to or smaller than a predetermined speed V0, for example, 2 km/h just before the vehicle stops, by finishing the brake force distribution control at the time t3 which is elapsed predetermined time ΔT, for example 300 msec, the second and fourth normally-open-type electromagnetic valves 6B and 6D are opened at the time t3 and in accordance therewith, the brake fluid pressure on the rear wheel side increases to be equal to the brake fluid pressure on the front wheel side.

Next, explaining of operation of the first embodiment, the brake force distribution control is finished when, for example, the predetermined time ΔT elapses just before the vehicle stops after the wheel speed of the rear wheel is reduced to be equal to or smaller than the predetermined speed V0. Therefore, even when the second and the fourth normally-open-type electromagnetic valves 6B and 6D in correspondence with the rear wheels are opened in accordance with finishing the brake force distribution control, it is difficult to recognize a bringing in of the brake pedal P by swing back of the vehicle at a stopping of the vehicle and the strange operational feeling can firmly be prevented from being deteriorated in finishing the brake force distribution control.

In contact thereto, when the brake force distribution control is finished when the vehicle speed becomes equal to or smaller than the predetermined speed V0, as shown by a broken line of FIG. 2, the brake fluid pressure on the rear wheel side is increased before the stopping of the vehicle and the operational feeling maybe deteriorated by bringing in of the brake pedal P.

Figure 3:
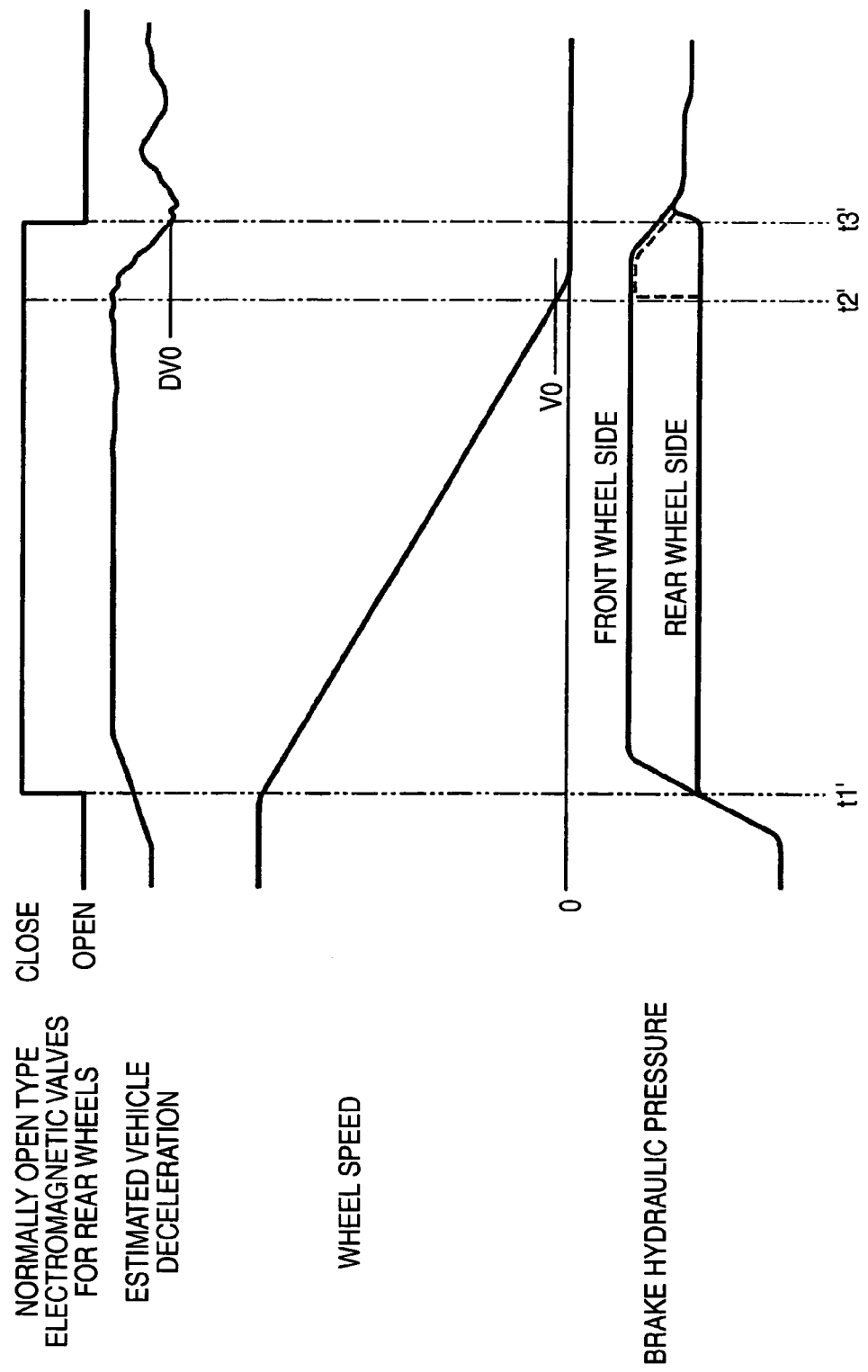
FIG. 3 is a timing chart in correspondence to FIG. 2 of a second embodiment corresponding to the fourth and fifth aspect of the present invention.

As a second embodiment corresponding to the fourth and fifth aspect of the present invention, as shown in FIG. 3, at time t1' in the braked state, the second and the fourth normally-open-type electromagnetic valves 6B and 6D corresponding to the wheels maybe closed responding to a starting the brake force distribution control and the brake force distribution control may be finished, for example at time t3' at which an estimated vehicle deceleration becomes a predetermined deceleration DV0 after, the wheel speed of the rear wheel is reduced to be equal to or smaller than the predetermined speed V0, for example 2 km/h, just before the vehicle stops.

Also according to the second embodiment, it is difficult to recognize bringing in of the brake pedal P by swing back of the vehicle at the stopping of the vehicle and the operational feeling can firmly be prevented from being deteriorated in finishing the brake force distribution control.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

For example, although according to the above-described embodiments, the brake force distribution control is finished when the predetermined time period elapses after the vehicle speed is reduced to be equal to or smaller than the predetermined speed immediately before stopping the vehicle body and when the estimated vehicle body deceleration degree becomes equal to or smaller than the set deceleration degree after the vehicle speed is reduced to be equal or smaller than the predetermined speed immediately before stopping the vehicle body, the brake force distribution control may be finished when the predetermined time period elapses after the estimated vehicle speed is reduced to be equal to or smaller than the predetermined speed immediately before stopping the vehicle body and when the estimated vehicle deceleration degree becomes equal to or smaller than the set deceleration degree after the estimated vehicle speed is reduced to be equal to or smaller than the predetermined speed immediately before stopping the vehicle body.

As described above, according to the first through fifteenth aspects of the present invention described above, it is difficult to recognize bringing in of the brake pedal by swing back of the vehicle at the stopping of the vehicle and the operational feeling can firmly be prevented from being deteriorated in finishing the brake force distribution control.

What is claimed is:
1. A brake control apparatus comprising:
   a brake pressure controlling unit including normally-open-type electromagnetic valves for preventing a fluid pressure transmitted from a master cylinder to wheel brakes when the valves close; and
   a control unit executing an anti-lock brake control resolving a lock tendency of the wheels by controlling the operation of the brake pressure controlling unit according to a result of judgment of the lock tendency of wheels, and simultaneously executing a brake force distribution control distributing front and rear brake forces by controlling the normally-open-type electromagnetic valves in correspondence with rear wheels to close in such a manner that the normally-open-type electromagnetic valves are opened when the brake force distribution control is finished;
   wherein the control unit finishes the brake force distribution control as a vehicle stops and after a frontward force applied to the vehicle is released and prior to a stop of the vehicle,
   wherein the control unit finishes the brake force distribution control after a predetermined time elapsed from when a wheel speed is reduced to be equal to or smaller than a predetermined wheel speed just before the vehicle stops, and wherein the predetermined time is 300 msec and the predetermined wheel speed is 2 km/h.

2. A brake control apparatus as set forth in claim 1, wherein the brake pressure control unit further including:
- a normally-open-type electromagnetic valve in correspondence with a wheel brake;
- a check valve connected in parallel with the normally-open-type electromagnetic valve;
- a normally-close-type electromagnetic valve in correspondence with the wheel brake; and
- a reservoir in correspondence with an output fluid path.

3. A brake control apparatus as set forth in claim 1, wherein the control unit finishes the brake force distribution control after a vehicle speed of the rear wheels is reduced to a pre-determined speed.

4. A brake control apparatus as set forth in claim 1, wherein the control unit finishes the brake force distribution control at a swing back time.

5. A brake control apparatus comprising:
- a brake pressure controlling unit including normally-open-type electromagnetic valves for preventing a fluid pressure transmitted from a master cylinder to wheel brakes when the valves close; and
- a control unit executing an anti-lock brake control resolving a lock tendency of the wheels by controlling the operation of the brake pressure controlling unit according to a result of judgment of the lock tendency of wheels, and simultaneously executing a brake force distribution control distributing front and rear brake forces by controlling the normally-open-type electromagnetic valves in correspondence with rear wheels to close in such a manner that the normally-open-type electromagnetic valves are opened when the brake force distribution control is finished;

wherein the control unit finishes the brake force distribution control as a vehicle stops and after a frontward force applied to the vehicle is released and prior to a stop of the vehicle, wherein the control unit finishes the brake force distribution control after an estimated deceleration is reduced to be equal to or smaller than a predetermined deceleration from when a wheel speed is reduced to be equal to or smaller than a predetermined wheel speed just before the vehicle stops, and wherein the predetermined wheel speed is 2 km/h.

* * * * *